US010895637B1

(12) United States Patent
Padmanabhan et al.

(10) Patent No.: US 10,895,637 B1
(45) Date of Patent: Jan. 19, 2021

(54) SYSTEMS AND METHODS FOR MAPPING MANMADE OBJECTS BURIED IN SUBTERRANEAN SURFACES USING AN UNMANNED AERIAL VEHICLE INTEGRATED WITH RADAR SENSOR EQUIPMENT

(71) Applicant: BGA Technology LLC, Bohemia, NY (US)

(72) Inventors: Saikumar Padmanabhan, Selden, NY (US); Srinivas Sridhar, Flushing, NY (US)

(73) Assignee: BGA Technology LLC, Bohemia, NY (US)

( * ) Notice: Subject to any disclaimer, the term of this patent is extended or adjusted under 35 U.S.C. 154(b) by 0 days.

(21) Appl. No.: 16/907,873

(22) Filed: Jun. 22, 2020

Related U.S. Application Data

(60) Provisional application No. 62/875,158, filed on Jul. 17, 2019.

(51) Int. Cl.
*G01S 13/88* (2006.01)
*G01S 13/90* (2006.01)
(Continued)

(52) U.S. Cl.
CPC .......... *G01S 13/885* (2013.01); *B64C 39/024* (2013.01); *G01S 13/9027* (2019.05);
(Continued)

(58) Field of Classification Search
CPC .... G01S 13/885; G01S 13/9027; G01S 19/42; B64C 39/024; B64C 2201/027; B64C 2201/12
(Continued)

(56) References Cited

U.S. PATENT DOCUMENTS

RE31,023 E  *  9/1982  Hall, III ................. A01D 46/24
                                                          137/236.1
5,673,050 A  *  9/1997  Moussally .......... G01S 13/0209
                                                            342/22
(Continued)

FOREIGN PATENT DOCUMENTS

EP       3364212 A1 *  8/2018  ............. G01S 13/90
WO   WO-2005031389 A2 *  4/2005  ............... E21B 7/04
(Continued)

OTHER PUBLICATIONS

Giovanni Ludeno, et al., "Assessment of a micro-UAV system for microwave tomography radar imaging", Remote Sensing of Environment, 212, Apr. 30, 2018, pp. 90-102.
(Continued)

*Primary Examiner* — Vladimir Magloire
*Assistant Examiner* — Nuzhat Pervin
(74) *Attorney, Agent, or Firm* — Carter, Deluca & Farrell LLP

(57) ABSTRACT

A method for mapping an object buried in a subterranean surface includes receiving a first input data set. The first input data set is based on a GNSS signal, a SAR signal, and a GPR signal. The method further includes generating a raw image based on the first input data set, comparing the raw image to a calibration data set, identifying an object based on the raw image compared to the calibration data set, transmitting object data to a ground-based post-processing unit, and displaying the object data to a graphic user interface. The calibration data set may be based on material calibration data. The object data may be based on the object identified.

18 Claims, 9 Drawing Sheets

(51) Int. Cl.
  *G01S 19/42* (2010.01)
  *B64C 39/02* (2006.01)
(52) U.S. Cl.
  CPC ........ *G01S 19/42* (2013.01); *B64C 2201/027* (2013.01); *B64C 2201/12* (2013.01)
(58) Field of Classification Search
  USPC .......................................................... 342/22
  See application file for complete search history.

(56) References Cited

U.S. PATENT DOCUMENTS

| | | | | |
|---|---|---|---|---|
| 6,252,538 | B1* | 6/2001 | Chignell | G01S 13/0209 342/195 |
| 6,590,519 | B2* | 7/2003 | Miceli | G01S 7/412 342/175 |
| 7,013,991 | B2* | 3/2006 | Wilson-Langman | E21B 7/04 175/40 |
| 7,336,078 | B1* | 2/2008 | Merewether | G01V 3/15 324/326 |
| 7,733,077 | B1* | 6/2010 | Merewether | G01V 3/10 324/67 |
| 8,106,660 | B1* | 1/2012 | Merewether | G01V 3/165 324/326 |
| 8,280,634 | B2* | 10/2012 | Young | G01V 11/002 702/5 |
| 9,411,066 | B1* | 8/2016 | Olsson | G01V 3/10 |
| 9,465,129 | B1* | 10/2016 | Olsson | G01V 3/15 |
| 9,703,002 | B1* | 7/2017 | Olsson | H01M 10/6563 |
| 10,318,822 | B2* | 6/2019 | Gao | G06K 9/00805 |
| 10,430,641 | B2* | 10/2019 | Gao | H04N 5/225 |
| 2003/0076254 | A1* | 4/2003 | Witten | H01Q 3/24 342/22 |
| 2004/0155810 | A1* | 8/2004 | Witten | G01S 7/28 342/22 |
| 2005/0061547 | A1* | 3/2005 | Wilson-Langman | E21B 47/00 175/40 |
| 2008/0079723 | A1* | 4/2008 | Hanson | G06K 9/0063 345/427 |
| 2011/0037639 | A1* | 2/2011 | Duran Toro | G01S 19/43 342/22 |
| 2011/0213585 | A1* | 9/2011 | Young | G01V 11/00 702/150 |
| 2012/0134533 | A1* | 5/2012 | Del Grande | G06K 9/0063 382/103 |
| 2014/0138477 | A1* | 5/2014 | Keennon | B64C 39/024 244/17.23 |
| 2016/0364989 | A1* | 12/2016 | Speasl | B64C 39/024 |
| 2017/0131424 | A1* | 5/2017 | Olsson | G01V 3/08 |
| 2017/0374354 | A1* | 12/2017 | Zhu | H04N 13/246 |
| 2018/0136093 | A1* | 5/2018 | Avakov | B64D 1/00 |
| 2018/0260613 | A1* | 9/2018 | Gao | H04N 5/225 |
| 2018/0293445 | A1* | 10/2018 | Gao | G08G 1/16 |
| 2019/0049293 | A1* | 2/2019 | Moore | G01J 1/0219 |
| 2019/0064362 | A1* | 2/2019 | Scott | G01S 13/885 |

FOREIGN PATENT DOCUMENTS

| | | | | |
|---|---|---|---|---|
| WO | WO-2017066679 | A1* | 4/2017 | G06T 17/05 |
| WO | WO-2019092418 | A1* | 5/2019 | G06T 7/277 |

OTHER PUBLICATIONS

Maria Garcia Fernandez, et al., "Synthetic Aperture Radar Imaging System for Landmine Detection Using a Ground Penetrating Radar on Board a Unmanned Aerial Vehicle", IEEEAccess, May 18, 2018, vol. 6, pp. 1-13.

* cited by examiner

SYSTEMS AND METHODS FOR MAPPING MANMADE OBJECTS BURIED IN SUBTERRANEAN SURFACES USING AN UNMANNED AERIAL VEHICLE INTEGRATED WITH RADAR SENSOR EQUIPMENT

CROSS REFERENCE TO RELATED APPLICATIONS

This application claims the benefit of U.S. Provisional Patent Application Ser. No. 62/875,158, filed on Jul. 17, 2019, the entire contents of which are incorporated by reference herein.

TECHNICAL FIELD

The present disclosure relates to subterranean mapping. More specifically, the present disclosure relates to mapping manmade objects and structures buried in subterranean surfaces using an unmanned aerial vehicle integrated with radar sensor equipment.

BACKGROUND

Current Ground penetrating radar (GPR) sensor equipment used to identify buried objects in subterranean surfaces work only when the equipment is in intimate contact with the ground surface and lifting the equipment even several inches off the ground results in a loss of useful data in identifying a buried object.

SUMMARY

Embodiments of the present disclosure are described in detail with reference to the drawings wherein like reference numerals identify similar or identical elements.

The disclosure relates to devices, systems, and methods for mapping manmade objects and structures buried in subterranean surfaces using an unmanned aerial vehicle integrated with radar sensor equipment.

In accordance with aspects of the disclosure, an unmanned aerial vehicle ("UAV") system for mapping an object buried in a subterranean surface is presented. The UAV system includes a UAV, a sensor array, a processor, and a memory. The memory includes instructions, which when executed by the processor, cause the UAV system to receive a first input data set and generate a raw image based on the first input data set. The first input data set is based on a Global Navigation Satellite System ("GNSS") signal, a Synthetic Aperture and RADAR ("SAR") signal, and a Ground Penetrating Radar ("GPR") signal.

In an aspect of the present disclosure, the sensor array may include a GNSS sensor disposed on the UAV configured to receive the GNSS signal, a SAR sensor disposed on the UAV configured to receive the SAR signal, and a GPR sensor disposed on the UAV configured to receive the GPR signal.

In another aspect of the present disclosure, the instructions, when executed, may further cause the system to compare the raw image to a calibration data set. The calibration data set may be based on material calibration data.

In yet another aspect of the present disclosure, the instructions, when executed, may further cause the system to identify an object based on the raw image compared to the calibration data set.

In a further aspect of the present disclosure, the instructions, when executed, may further cause the system to transmit object data to a ground-based post-processing unit for further identifying the object data. The object data may be based on the object identified.

In yet a further aspect of the present disclosure, the instructions, when executed, may further cause the system to display the object data to a graphic user interface.

In an aspect of the present disclosure, the instructions, when executed, may further cause the system to generate an augmented image based on the first input data set, the calibration data set, and the identified object.

In another aspect of the present disclosure, the instructions, when executed, may further cause the system to display the augmented image to a graphic user interface.

In yet another aspect of the present disclosure, the instructions, when executed, may further cause the system to generate an augmented image based on the post-processed object data.

In a further aspect of the present disclosure, the material calibration data may be based on unique spectral reflection patterns of an object in a controlled environment at predefined heights and subterranean conditions.

In yet a further aspect of the present disclosure, the instructions, when executed, may further cause the system to determine, by a machine learning algorithm, the identification of unknown objects buried underground in various subterranean environments by analyzing the first input data set.

In an aspect of the present disclosure, the machine learning algorithm may include a neural network.

In another aspect of the present disclosure, the instructions, when displaying the object data to a graphic user interface, may further cause the system to generate a 3D image based on comparing the raw image to the calibration data set.

In yet another aspect of the present disclosure, the 3D image may include at least one of a survey path, a depth slice, or a field overlay.

In accordance with aspects of the disclosure, a method for mapping an object buried in a subterranean surface is presented. The method includes receiving a first input data set and generating a raw image based on the first input data set. The first input data set based on a Global Navigation Satellite System ("GNSS") signal, a Synthetic Aperture and RADAR ("SAR") signal, and a Ground Penetrating Radar ("GPR") signal.

In a further aspect of the present disclosure, the method may further include comparing the raw image to a calibration data set, the calibration data set based on material calibration data and identifying an object based on the raw image compared to the calibration data set.

In yet a further aspect of the present disclosure, the method may further include transmitting object data to a ground-based post-processing unit, the object data based on the object identified.

In an aspect of the present disclosure, the method may further include displaying the object data to a graphic user interface.

In another aspect of the present disclosure, the method may further include determining, by a machine learning algorithm, the identification of unknown objects buried underground in various subterranean environments by analyzing the first input data set.

In accordance with aspects of the disclosure, a non-transitory storage medium stores a program causing a processor to execute a method for mapping an object buried in a subterranean surface. The method, when executed by the processor, includes receiving a first input data set, generating a raw image based on the first input data set, comparing the raw image to a calibration data set, the calibration data set based on material calibration data, and identifying an object based on the raw image compared to the calibration data set. The first input data set is based on a Global Navigation Satellite System ("GNSS") signal, a Synthetic Aperture RADAR ("SAR") signal, and a Ground Penetrating Radar ("GPR") signal.

Further details and aspects of exemplary embodiments of the present disclosure are described in more detail below with reference to the appended figures.

BRIEF DESCRIPTION OF THE DRAWINGS

A better understanding of the features and advantages of the disclosed technology will be obtained by reference to the following detailed description that sets forth illustrative embodiments, in which the principles of the technology are utilized, and the accompanying drawings of which.

Figure 1A:
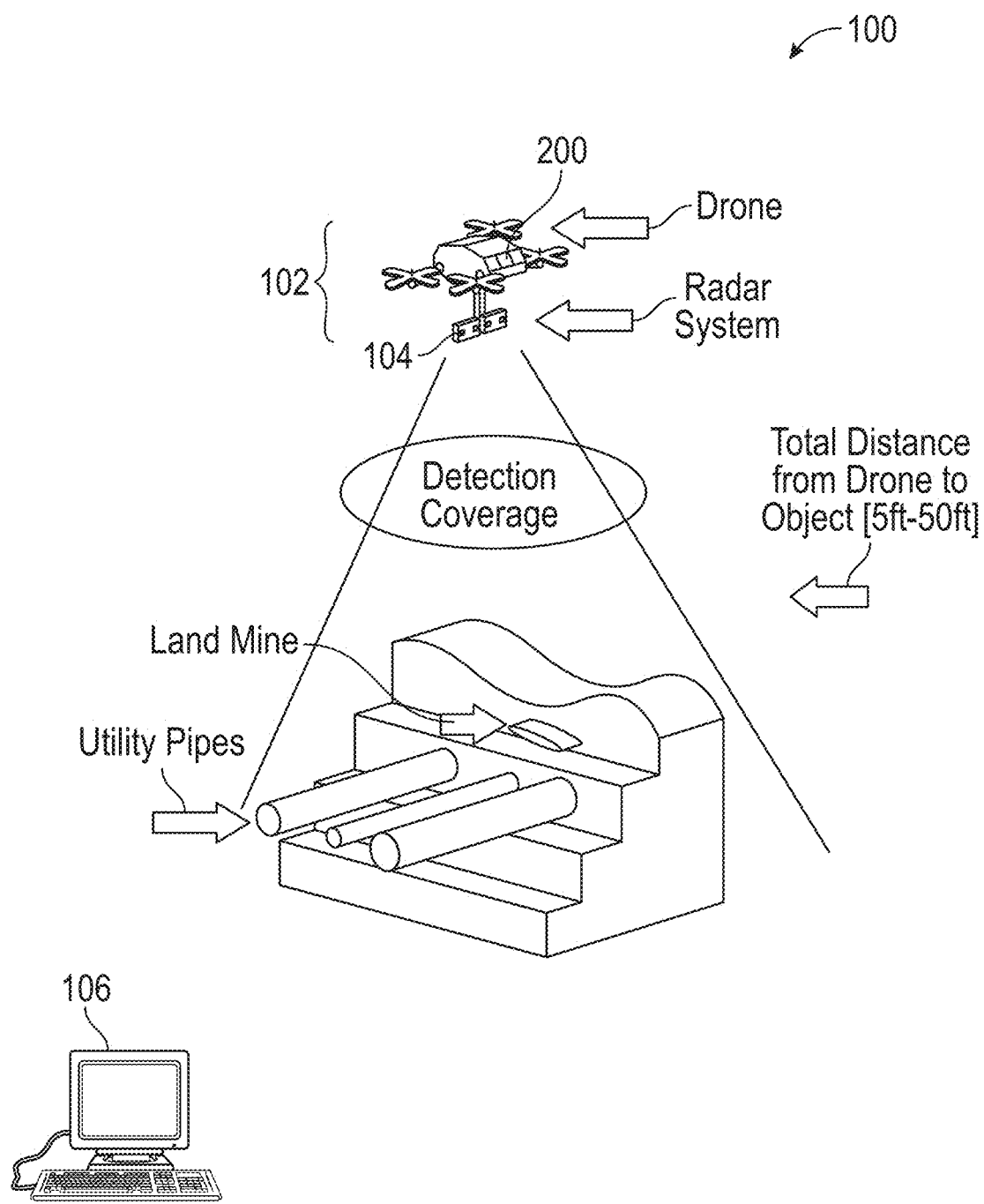
FIG. 1A is a diagram illustrating an embodiment of a system for mapping manmade objects buried in subterranean surfaces using UAV integrated with RADAR sensor equipment, in accordance with the present disclosure.

Further details and aspects of exemplary embodiments of the disclosure are described in more detail below with reference to the appended figures. Any of the above aspects and embodiments of the disclosure may be combined without departing from the scope of the disclosure.

DETAILED DESCRIPTION

This disclosure relates to systems and methods for mapping manmade objects and structures buried in subterranean surfaces using UAV integrated with RADAR sensor equipment.

Although the present disclosure will be described in terms of specific embodiments, it will be readily apparent to those skilled in this art that various modifications, rearrangements, and substitutions may be made without departing from the spirit of the present disclosure. The scope of the present disclosure is defined by the claims appended hereto.

For purposes of promoting an understanding of the principles of the present disclosure, reference will now be made to exemplary embodiments illustrated in the drawings, and specific language will be used to describe the same. It will nevertheless be understood that no limitation of the scope of the present disclosure is thereby intended. Any alterations and further modifications of the inventive features illustrated herein, and any additional applications of the principles of the present disclosure as illustrated herein, which would occur to one skilled in the relevant art and having possession of this disclosure, are to be considered within the scope of the present disclosure.

Current Ground Penetrating Radar ("GPR") sensor equipment used to identify buried objects in subterranean surfaces work only when the equipment is in intimate contact with the ground surface and lifting the equipment even several inches off the ground results in a loss of useful data in identifying a buried object.

The present disclosure provides a novel system and method for mapping manmade objects and structures buried in subterranean surfaces using an unmanned aerial vehicle integrated with radar sensor equipment. The systems and methods provided in the present disclosure may be used to sense and identify objects from approximately 5 ft to over 50 ft above ground level when the RADAR sensor equipment is mounted on a UAV (e.g., a drone). An aspect of the present disclosure may enable aerial study of areas not accessible by ground-based equipment and personnel. An aspect of the present disclosure may allow mapping of objects including, but not limited to, subsurface manmade structures such as private utilities, sewer laterals, electrical systems, gas conduits, and land mines. For a more detailed description of an example UAV, reference can be made to U.S. Pat. No. 8,989,922 to Jones et al., the entire contents of which are incorporated by reference herein.

The present disclosure includes a RADAR unit mounted on a commercial drone such as disclosed in the above patent which may fly at a specific height to detect manmade subsurface structures.

The system disclosed in the present disclosure may be able to perform non-contact spectral measurements of manmade objects underneath different soil compositions by using Radio Frequency ("RF") and Microwave ("MW") Frequencies, RF/MW transmission power, and improved receiver sensitivity and modulation techniques, which may be conducive to specific soil and object types, subterranean depth, and other properties. Certain RF frequencies may provide better radar signal resolution in different soil types based on properties such as electrical conductivity, moisture content, electromagnetism, and the distance of the object from the surface of the terrain. Further, several selective frequencies in different microwave bands from the L-Band to the Ku-Band may be used. Further, various RF/MW transmission power levels may be used, based on the terrain type and object depth. For example, the UAV may perform non-contact spectral measurements of objects underneath different soil compositions, including, but not limited to, a land mine buried approximately 5 ft underground in the sand, a utility pipe buried approximately 20 ft underground in loamy soil, or an oil tank buried approximately 50 ft underground in clay soil. For example, if the soil has a relative dielectric permeability of about 4, then the disclosed system can detect objects as deep as approximately 120 meters.

The system disclosed in the present disclosure may be capable of storing calibration data of manmade structures in the form of their unique spectral reflection pattern in a controlled environment at predefined heights and subterranean conditions. The calibration data may be stored on the onboard storage device 208 (see FIG. 2) and/or on the ground-based post-processing unit 106 (see FIG. 1A). For example, the spectral reflection pattern of a land mine buried approximately 5 ft underground in loamy soil may be different than the spectral reflection pattern of an oil tank buried approximately 50 ft underground in clay soil. The stored calibration data may be used for comparison purposes during field use.

The system disclosed in the present disclosure may integrate GPR signals, SAR signals, and survey grade GNSS signals. Further, an aspect of the present disclosure may include using specially developed conformal mapping software techniques that may identify various buried manmade objects and structures over a wide area of terrain under different soil conditions. For example, various buried manmade objects may include but are not limited to, objects such as land mines, utility pipes, oil tanks, sewer laterals, electrical systems, gas conduits, and so forth. Furthermore, examples of soil conditions may include but are not limited to, clay soils, sandy soils, silt soils, loams, peat soil, chalky soils, ice, and so forth. In addition, the system disclosed in the present disclosure may be deployed above or underwater.

Figure 1B:
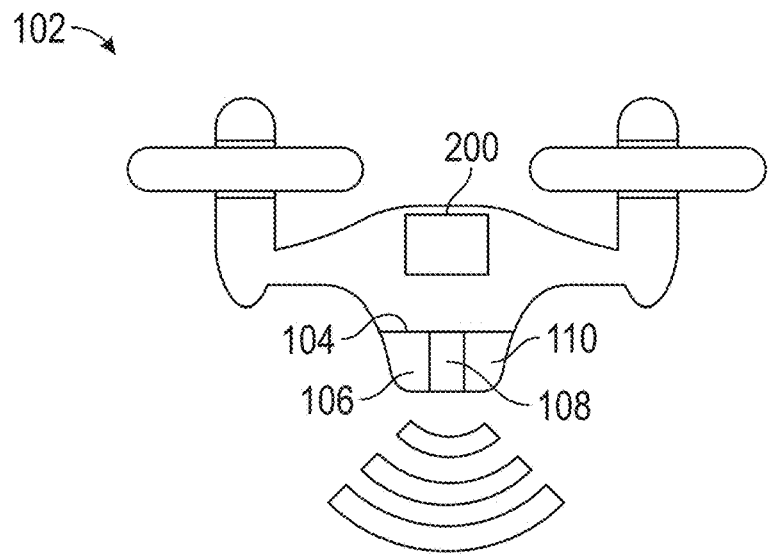
FIG. 1B is a diagram illustrating the UAV integrated with RADAR sensor equipment of FIG. 1, in accordance with the present disclosure.

With reference to FIGS. 1A-B, a diagram illustrating an embodiment of the system for mapping manmade objects buried in subterranean surfaces using a UAV system integrated with RADAR sensor equipment is shown. The UAV system 100 may include a UAV 102 equipped with a sensor module 104 which includes multiple sensors, including a GNSS sensor 106, a GPR sensor 108, and a SAR sensor 110. The GNSS (or Global Positioning System "GPS") sensor 106 may be configured to receive a GNSS (or GPS or Satellite-based augmentation system) signal, the GPR sensor 108 may be configured to receive a GPR signal, and the SAR sensor 110 may be configured to receive a SAR signal. Further, the UAV may be equipped with a controller 200, which may identify objects in subterranean environments based on the given input data, including GNSS signal data (e.g., location data), GPR signal data (e.g., tomographic data), and SAR signal data (e.g., topological data). Further, the UAV system 100 may include a ground-based post-processing computer 106 which may communicate with the UAV 102 as well as store material calibration data.

The GPS is a satellite-based radio-navigation system that provides geolocation and time information to a GPS receiver anywhere on or near the Earth where there is an unobstructed line of sight to four or more GPS satellites. Obstacles such as mountains and buildings may block the relatively weak GPS signals. GPS does not require the user to transmit any data, and it operates independently of any telephonic or internet reception, though these technologies can enhance the usefulness of the GPS positioning information. The GPS concept is based on time and the known position of GPS specialized satellites. The satellites carry very stable atomic clocks that are synchronized with one another and with the ground clocks. Any drift from true time maintained on the ground is corrected daily. Each GPS satellite continuously transmits a radio signal containing the current time and data about its position. Since the speed of radio waves is constant and independent of the satellite speed, the time delay between when the satellite transmits a signal and the receiver receives it is proportional to the distance from the satellite to the receiver. A GPS receiver monitors multiple satellites and solves equations to determine the precise position of the receiver and its deviation from true time. At a minimum, four satellites must be in view of the receiver for it to compute four unknown quantities (three position coordinates and clock deviation from satellite time).

Each GPS satellite continually broadcasts a signal (carrier wave with modulation) that includes a pseudorandom code (sequence of ones and zeros) that is known to the receiver. By time-aligning a receiver-generated version and the receiver measured version of the code, the time of arrival ("TOA") of a defined point in the code sequence, called an epoch, can be found in the receiver clock time scale. The broadcast signal also includes a message that includes the time of transmission ("TOT") of the code epoch (in GPS time scale) and the satellite position at that time. Conceptually, the receiver measures the TOAs (according to its own clock) of four satellite signals. From the TOAs and the TOTs, the receiver forms four time-of-flight ("TOF") values which are (given the speed of light) approximately equivalent to receiver-satellite ranges. The receiver then computes its three-dimensional position and clock deviation from the four TOFs. In practice the receiver position (in three-dimensional Cartesian coordinates with origin at the Earth's center) and the offset of the receiver clock relative to the GPS time are computed simultaneously, using the navigation equations to process the TOFs. The receiver's Earth-centered solution location is usually converted to latitude, longitude, and height relative to an ellipsoidal Earth model. The height may then be further converted to height relative to the geoid, which is essentially mean sea level. These coordinates may be displayed, such as on a moving map display, or recorded, or used by some other system, such as a vehicle guidance system.

Survey grade GNSS uses signals from the L1 and L2 GPS frequencies to bring the accuracy of relative positioning down to cm level accuracy. Survey grade GNSS may use carrier phase differential GPS.

Satellite-based augmentation systems (SBAS) support wide-area or regional augmentation through the use of additional satellite-broadcast messages. Using measurements from the ground stations, correction messages are created and sent to one or more satellites for broadcast to end users as differential signals. SBAS is sometimes synonymous with WADGPS, wide-area Differential GPS.

Ground penetrating radar ("GPR") is a geophysical method that uses radar pulses to image the subsurface. The GPR may include a control unit, a power amplifier, a signal source configured for modulation, a transmitter, a receiver, a transmitting antenna, and a receiving antenna. GPR uses electromagnetic radiation in the microwave band (UHF/VHF frequencies) of the radio spectrum and detects the reflected signals from subsurface structures. GPR can have applications in a variety of media, including rock, soil, ice, fresh water, pavements, and structures. Individual lines of GPR data represent a sectional (profile) view of the subsurface. Multiple lines of data systematically collected over an area may be used to construct three-dimensional or tomographic images. Data may be presented as three-dimensional blocks, or as horizontal or vertical slices. Horizontal slices (known as "depth slices" or "time slices") are essentially plain view maps isolating specific depths. GPR may be used to help detect subsurface objects, changes in material properties, and voids and cracks. GPR uses high-frequency (usually polarized) radio waves. A GPR transmitter and antenna emits electromagnetic energy into the ground. When the energy encounters a buried object or a boundary between materials having different permittivities, it may be reflected or refracted or scattered back to the surface. A receiving antenna can then record the variations in the return signal. The principles involved are similar to seismology, except GPR methods implement electromagnetic energy rather than acoustic energy, and energy may be reflected at boundaries where subsurface electrical properties change rather than subsurface mechanical properties as is the case with seismic energy. The electrical conductivity of the ground, the transmitted center frequency, and the radiated power all may limit the effective depth range of GPR investigation. Increases in electrical conductivity attenuate the introduced electromagnetic wave, and thus, the penetration depth decreases. Because of frequency-dependent attenuation mechanisms, higher frequencies do not penetrate as far as lower frequencies. Thus, operating frequency is always a trade-off between resolution and penetration. For example, optimal depth of subsurface penetration is achieved in ice where the depth of penetration can achieve several thousand meters (e.g., bedrock in Greenland), at low GPR frequencies. Dry sandy soils or massive dry materials such as granite, limestone, and concrete tend to be resistive rather than conductive, and the depth of penetration could be up to 15 meters (49 ft.). However, at higher frequencies such as about 3 GHz and above, in moist or clay-laden soils and materials with high electrical conductivity, penetration may be as little as a few centimeters. GPR antennas are generally in contact with the ground for the strongest signal strength. However, GPR air-launched antennas can be used above the ground. In the present disclosure, a GPR antenna may be mounted on a UAV. One of the main applications for GPR is for locating underground utilities. Standard electromagnetic induction utility locating tools require utilities to be conductive. These tools are ineffective for locating plastic conduits or concrete storm and sanitary sewers. Since GPR detects variations in dielectric properties in the subsurface, GPR can be highly effective for locating non-conductive utilities.

SAR is a form of radar that may be used to create two-dimensional images or three-dimensional reconstructions of objects, such as landscapes. SAR may use the motion of the radar antenna over a target region to provide finer spatial resolution than conventional beam-scanning radars. SAR may be mounted on a moving platform, such as an aircraft or a spacecraft. In the present disclosure, SAR may be mounted on a UAV. The distance the SAR device travels over a target in the time taken for the radar pulses to return to the antenna creates the large synthetic antenna aperture. The larger the aperture, the higher the image resolution will be, regardless of whether the aperture is physical (a large antenna) or synthetic (a moving antenna). This allows SAR to create high-resolution images with comparatively small physical antennas. To create a SAR image, successive pulses of radio waves may be transmitted to "illuminate" a target scene, and the echo of each pulse may be received and recorded. The pulses may be transmitted, and the echoes may be received using a single beam-forming antenna, with wavelengths of a meter down to several millimeters. As the SAR device on board the aircraft or spacecraft moves, the antenna location relative to the target changes with time. Signal processing of the successively recorded radar echoes may allow the combining of the recordings from these multiple antenna positions. This process forms the synthetic antenna aperture and allows the creation of higher-resolution images that would otherwise be possible with a given physical antenna. SAR may be capable of high-resolution remote sensing, independent of flight altitude, and independent of weather, as SAR can select frequencies to avoid weather caused signal attenuation. SAR may have day and night imaging capability, as illumination may be provided by the SAR. In various embodiments, applications for the system may include finding leaks in underground pipes.

Although the present disclosure contemplates using radar equipment that includes an array of radar sensors including a GNSS sensor, a GPR sensor, and a SAR sensor, it is known to those skilled in the art that other types of sensors may be configured to provide other suitable sensed data while not departing from the scope of the present disclosure. The term "radar" may include, but is not limited to, GPR, SAR, LIDAR, bistatic radar, continuous wave radar, doppler radar, fm-cw radar, monopulse radar, passive radar, planar array radar, pulse doppler radar, over-the-horizon radar, among other types of radar sensing techniques.

Figure 2:
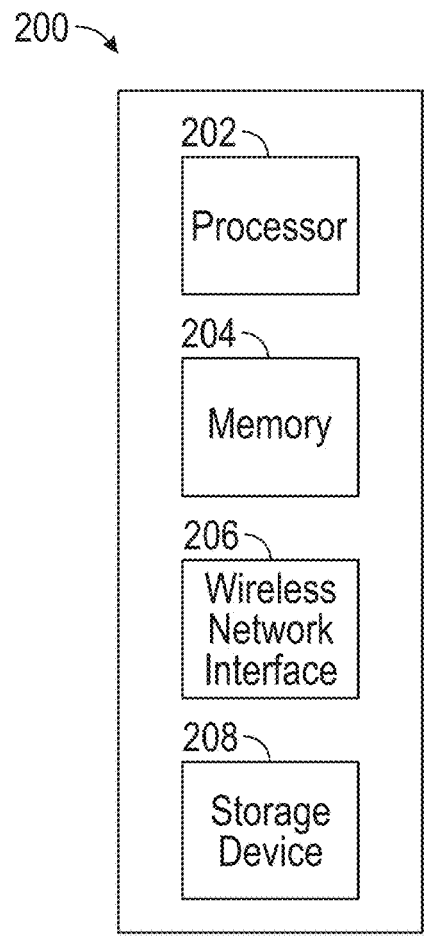
FIG. 2 is a block diagram illustrating an exemplary embodiment of a controller, in accordance with the present disclosure.

With reference to FIG. 2, a block diagram illustrating an exemplary embodiment of a controller is shown. The controller 200 may be equipped to a UAV, in accordance with the present disclosure. The controller 200 may include a processor 202, a memory 204, a wireless network interface 206, and a storage device 208. The memory 204 includes instructions, that when executed by the processor 202, cause the system disclosed in the present disclosure to identify an object in a subterranean environment, which is described in greater detail hereinbelow in the present disclosure. The controller 200 may also be equipped with a wireless network interface 206, which may allow the controller 200 to communicate with an offsite ground-based post-processing unit, which is described in greater detail hereinbelow in the present disclosure. Furthermore, a storage device 208 may be used for storing data.

In various embodiments, the memory 204 can be random access memory, read-only memory, magnetic disk memory, solid state memory, optical disc memory, and/or another type of memory. In various embodiments, the memory 204 can be separate from the controller 200 and can communicate with the processor 202 through communication buses of a circuit board and/or through communication cables such as serial ATA cables or other types of cables. The memory 204 includes computer-readable instructions that are executable by the processor 202 to operate the controller 200. In various embodiments, the controller 200 may include a wireless network interface 206 to communicate with other computers or a server. In embodiments, a storage device 208 may be used for storing data. In various embodiments, the processor 202 may be, for example, without limitation, a digital signal processor, a microprocessor, an ASIC, a graphics processing unit ("GPU"), field-programmable gate array ("FPGA"), or a central processing unit ("CPU").

The memory 204 stores suitable instructions, to be executed by the processor 202, for receiving the sensed data (e.g., sensed data from GPS, GPR, and SAR sensors), accessing storage device 208 of the controller 200, generating a raw image based on the sensed data, comparing the raw image to a calibration data set, identifying an object based on the raw image compared to the calibration data set, transmitting object data to a ground-based post-processing unit, and displaying the object data to a graphic user interface. Although illustrated as part of the UAV, it is also contemplated that controller 200 be remote from the UAV (e.g., on a remote server), and accessible by the UAV via a wired or wireless connection. In embodiments where controller 200 is remote, it is contemplated that controller 200 may be accessible by and connected to multiple UAVs.

Storage device 208 of controller 200 may store one or more machine learning algorithms and/or models, configured to detect various objects in various underground environments (e.g., manmade objects underground in different soil conditions). The machine learning algorithm(s) may be trained on, and learn from experimental data and/or previously measured data which may be initially input into the one or more machine learning applications in order to enable the machine learning application(s) to identify objects underground based upon such data. Such data may include object data, subterranean environment data, soil condition data, electromagnetic data, conductivity data, and any other suitable data.

Figure 3:
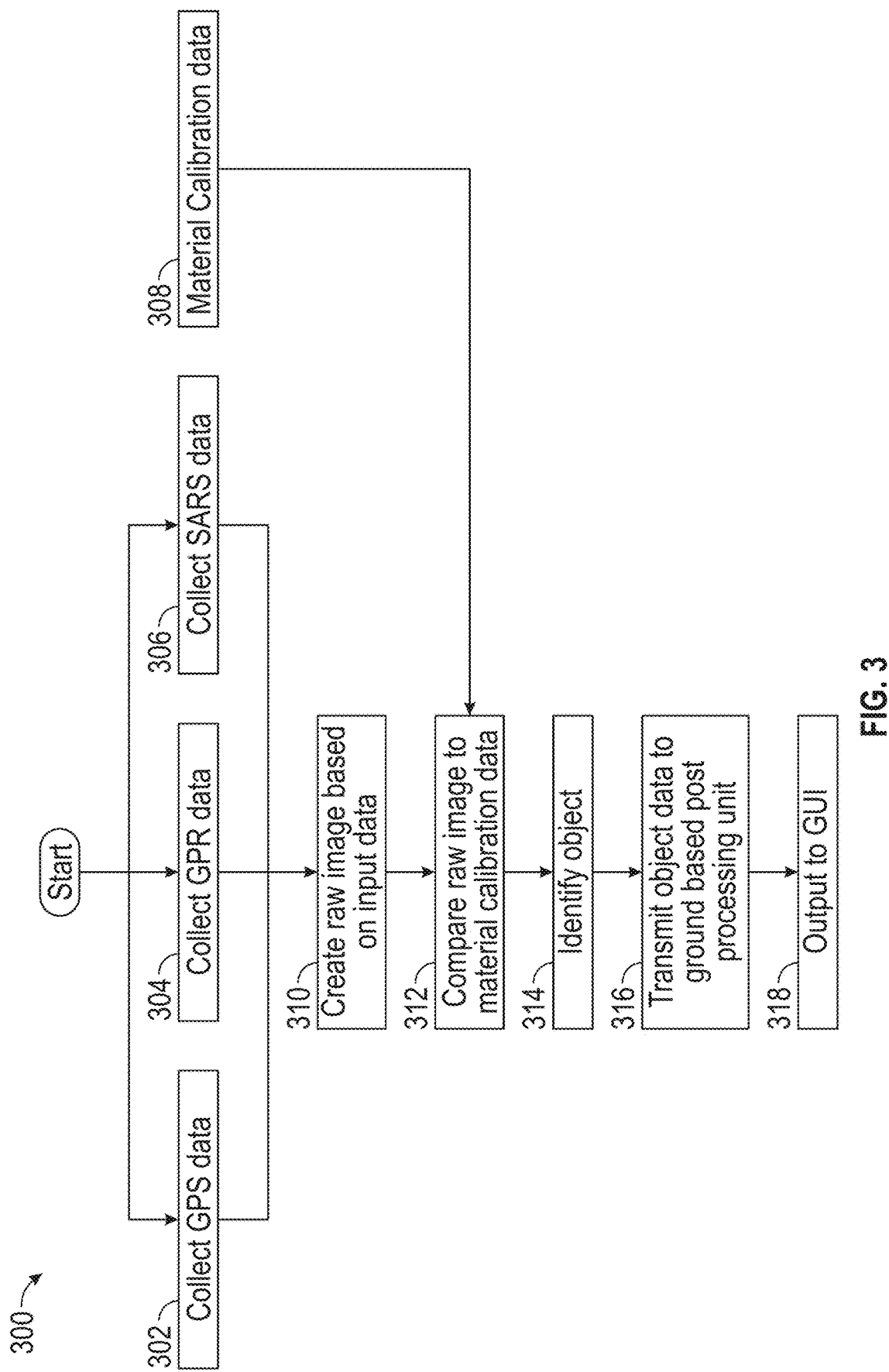
FIG. 3 is a flowchart illustrating an exemplary embodiment of a system and method for mapping manmade objects and structures buried in subterranean surfaces using a UAV integrated with radar sensor equipment, in accordance with the present disclosure.

With reference to FIG. 3, a flowchart illustrating an exemplary embodiment of a system and method for mapping manmade objects and structures buried in subterranean surfaces using an unmanned aerial vehicle integrated with radar sensor equipment is shown. Initially, at steps 302, 304, and 306, the controller may obtain at least GNSS (or GPS) data, GPR, or SAR data from the GNSS, GPR, and SAR sensors equipped on the UAV. The GNSS sensor may be configured to receive a GNSS signal, the SAR sensor may be configured to receive a SAR signal, and the GPR sensor may be configured to receive a GPR signal. For example, the GPR signal may be in the frequency range of about 10 MHz to about 300 MHz. The GPR sensor may have a sampling interval of about 320 MHz or 3.125 ns and a PRF rate of about 156 KHz. For example, the stacking may be approximately 323,000 stacks/second and provide about a 45 dB increase in signal to noise ratio. In various embodiments, GPS, SBAS or other positioning system may be used.

For example, radio frequency signals are emitted towards the ground and reflected back by any buried objects and by the ground surface. GPR, GNSS and SAR measurements are taken at each position of a UAV flight path.

Next, at step 310, the controller 200 may generate a raw image from the GNSS, GPR, and SAR data. GPR, GNSS and SAR measurements which were taken at each position of a UAV flight path are coherently combined. For example, the controller 200 may generate a raw image of a yet unidentified object in sandy soil.

Next, at step 312, the controller 200 may compare the raw image may to the Material Calibration Data 308. For example, the material calibration data may include samples of manmade objects from various heights in various types of soil. For example, iron pipes in sandy soil.

Next, at step 314, the controller 200 may identify an object in a given subterranean environment based on the comparison. For example, based on the comparison, the controller 200 may identify the object as a pipe. Next, at step 316, the controller 200 may transmit the object data to a ground-based post-processing unit 106.

Next, at step 318, the controller 200 may output the identified object to a ground base post-processing computer unit. Further, the ground-based post-processing computer unit may display the identified subterranean object on a Graphic User Interface ("GUI"). For example, the ground based post-processing computer unit may display on the display an augmented image displaying the identified subterranean pipe.

Figure 4:
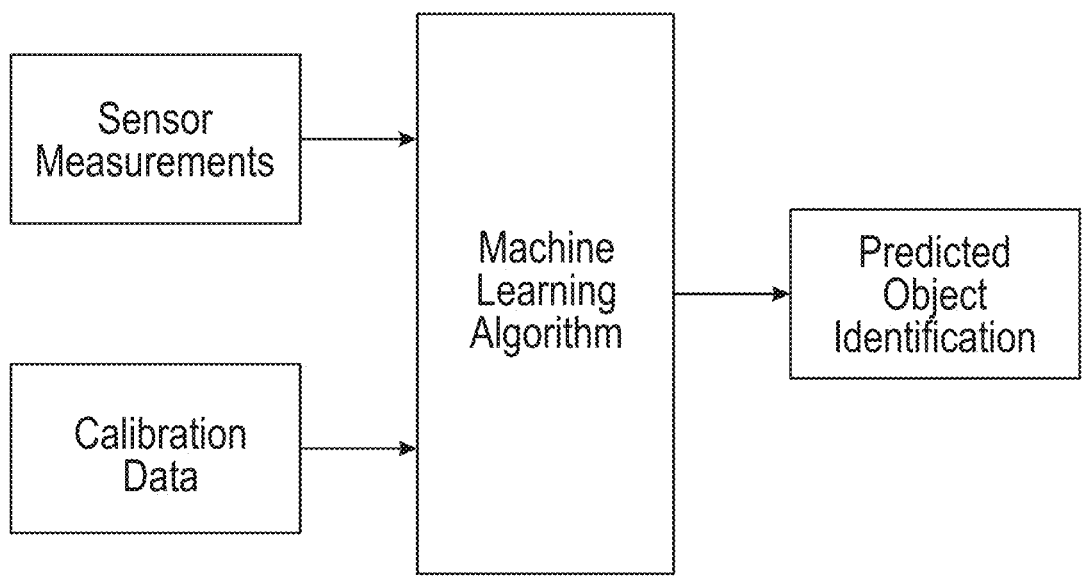
FIG. 4 is a block diagram of supervised machine learning in accordance with the disclosure.

With reference to FIG. 4, a block diagram of supervised machine learning in accordance with the disclosure is shown. Machine learning algorithms are advantageous for use in identifying objects in subterranean environments at least in that machine learning algorithms may improve the functionality of complex sensor components. Machine learning algorithms utilize the initial input data (e.g., the previous object-identification data, current object-identification data, and/or experimental data), to determine statistical features and/or correlations that enable the identification of unknown objects buried underground in various subterranean environments by analyzing data therefrom. Thus, with the one or more machine learning algorithms having been trained as detailed above, such can be used to identify objects underground. More specifically, processor 202 of controller 200 is configured, in response to receiving sensed data from sensory circuitry (e.g., from GNSS sensors, GPR sensors, and SAR sensors), to input the sensed data into the machine learning algorithm(s) stored in storage device 208 in order to correctly identify an object buried underground. Although described with respect to a UAV system, the aspects and features of controller 200 and the machine learning algorithms configured for use therewith are equally applicable for use with other suitable vehicle systems (e.g., an autonomous ground vehicle system and/or an autonomous watercraft system).

The terms "artificial intelligence," "data models," or "machine learning" may include, but are not limited to, neural networks, deep neural networks, recurrent neural networks (RNN), generative adversarial networks (GAN), Bayesian Regression, Naive Bayes, Monte Carlo Methods, nearest neighbors, least squares, means, and support vector regression, among other data science, artificial intelligence, and machine learning techniques. Exemplary uses are identifying patterns and making predictions relating to unknown manmade objects buried in subterranean environments, which will be described in more detail hereinbelow.

The term "application" may include a computer program designed to perform particular functions, tasks, or activities for the benefit of a user. Application may refer to, for example, software running locally or remotely, as a stand-alone program or in a web browser, or other software which would be understood by one skilled in the art to be an application. An application may run on the controller 200 or on a user device, including for example, on a mobile device, an IOT device, or a server system.

The UAV system may identify an object underground using at least one machine learning algorithm. For example, the UAV system may use machine learning in order to increase the statistical probability that an object buried in a subterranean environment will be correctly identified. In various embodiments, by using a machine learning algorithm, various objects buried underground in various subterranean environments may be identified.

In various embodiments, the neural network may include a temporal convolutional network or a feed-forward network. In various embodiments, the neural network may be trained using one or more of measuring sensor data or identifying patterns in data. In various embodiments, training the machine learning algorithm may be performed by a computing device outside of the UAV (e.g., the ground-based post-processing unit), and the resulting algorithm may be communicated to the controller 200 of the UAV.

In one aspect of the present disclosure, the algorithms in the present disclosure may be trained using supervised learning. Supervised learning is the machine learning task of learning a function that maps an input to an output based on example input-output pairs. It infers a function from labeled training data consisting of a set of training examples. In supervised learning, each example is a pair consisting of an input object (typically a vector) and a desired output value (also called the supervisory signal). A supervised learning algorithm analyzes the training data and produces an inferred function, which can be used for mapping new examples. In various embodiments, the algorithm may correctly determine the class labels for unseen instances. This requires the learning algorithm to generalize from the training data to unseen situations in a "reasonable" way.

In various embodiments, the neural network may be trained using training data, which may include, for example, different soil conditions, different object characteristics (e.g., electromagnetism, conductivity, and so forth). Example input-output pairs in the present disclosure may include the different RF/MW frequencies of different objects buried in different soil conditions, and the output may be a predicted object buried in a specific subterranean environment. The algorithm may analyze this training data, and produce an inferred function that may allow the algorithm to identify unknown objects in subterranean environments, based on the generalizations the algorithm has developed from the training data. In various embodiments, training may include at least one of supervised training, unsupervised training or reinforcement learning.

In various embodiments, the neural network may include, for example, a three-layer temporal convolutional network with residual connections, where each layer may include three parallel convolutions, where the number of kernels and dilations increase from bottom to top, and where the number of convolutional filters increases from bottom to top. It is contemplated that a higher or lower amount of layers may be used. It is contemplated that a higher or lower number of kernels and dilations may also be used.

Figure 5:
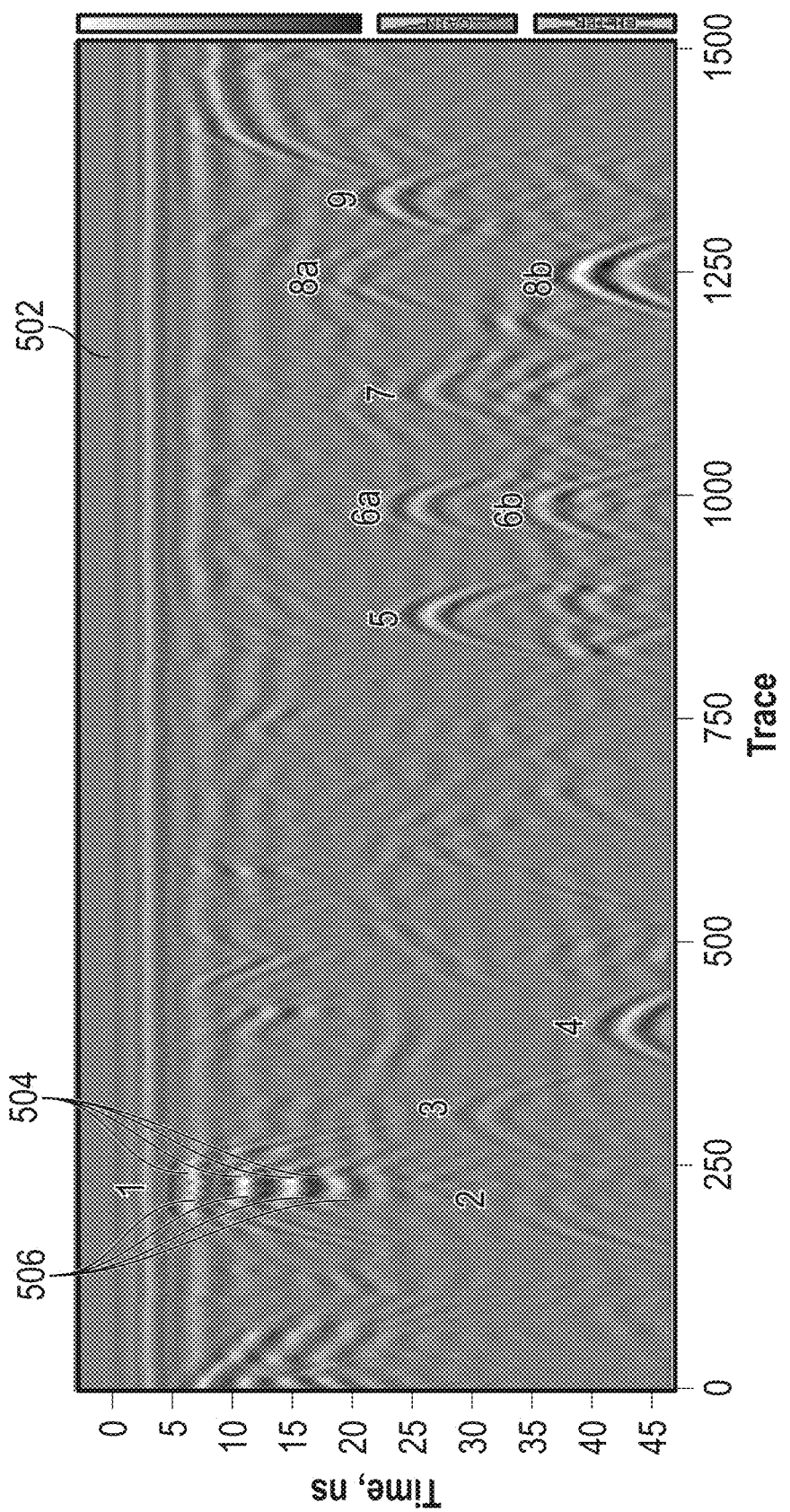
FIG. 5 is a graph illustrating time vs. traces for estimated pipe material, in accordance with the present disclosure.
Figure 6:
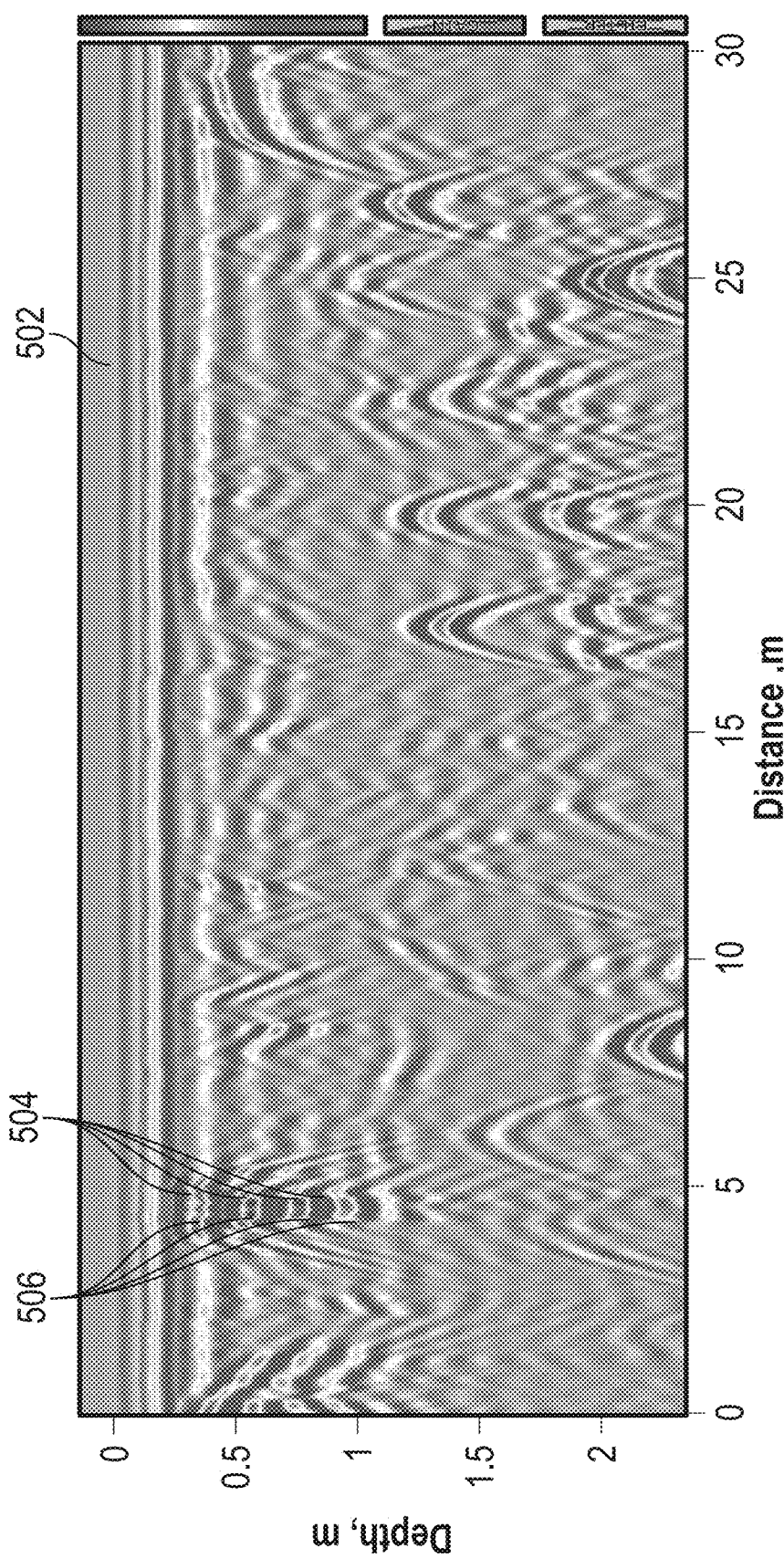
FIG. 6 is a graph illustrating depth vs. distance of the estimated pipe material of FIG. 5.

Referring to FIGS. 5 and 6 are graphs illustrating time vs traces and depth vs distance for estimated pipe material, in accordance with the present disclosure. GPR target amplitudes depend on the difference in Relative Dielectric Permittivity (RDP) value, between the target and the material. These RDP changes can be seen using proper color scales with an estimation of target material. The example RDP-values in FIGS. 5 and 6 are Soil RDP=10, Concrete pipe: RDP=9, polyethylene (PE) pipe: RDP=4 and water: RDP=81 and Iron with RDP=+1000000. Targets 2, 3, and 8a show a small difference in RDP. Targets 1 and 8b have strong amplitudes and targets 4, 5, 6, 7, and 9 have medium amplitudes.

FIG. 5 shows: an ground/air interface 520; 1: four shallow, 4 mm iron rebars 504 (the light areas), spaced approximately 20 cm apart (the dark areas are the reflections 506); 2: 60 cm concrete pipe, (hidden by rebar multiples); 3: 80 cm concrete pipe (weak amplitude); 4: 60 cm PE-pipe (strong reflection); 5: 25 cm PE-pipe (air-filled); 6: 18 cm PE-pipe (water-filled, 6a-b TWT=11 ns, OK); 7: 7 cm cast iron pipe (small diameter-weak amplitude); 8: 30 cm PE-pipe (water-filled, 8a-b TWT=18 ns, OK); and 9: 16 cm PE-pipe (air-filled).

For example, if the pipe is water-filled, the dimensions can sometimes be estimated using time difference between top and bottom reflection of the pipe. (See FIGS. 5 6a to 6b and 8a to 8b). If the pipe is gas or air-filled one will not see both top and bottom reflection due to small difference in time. For example, if an 18 cm pipe is air-filled, the time difference between top and bottom reflection of the pipe is approximately 1.2 ns. However, when the same pipe is water-filled, the time difference is approximately 11 ns.

Figure 7:
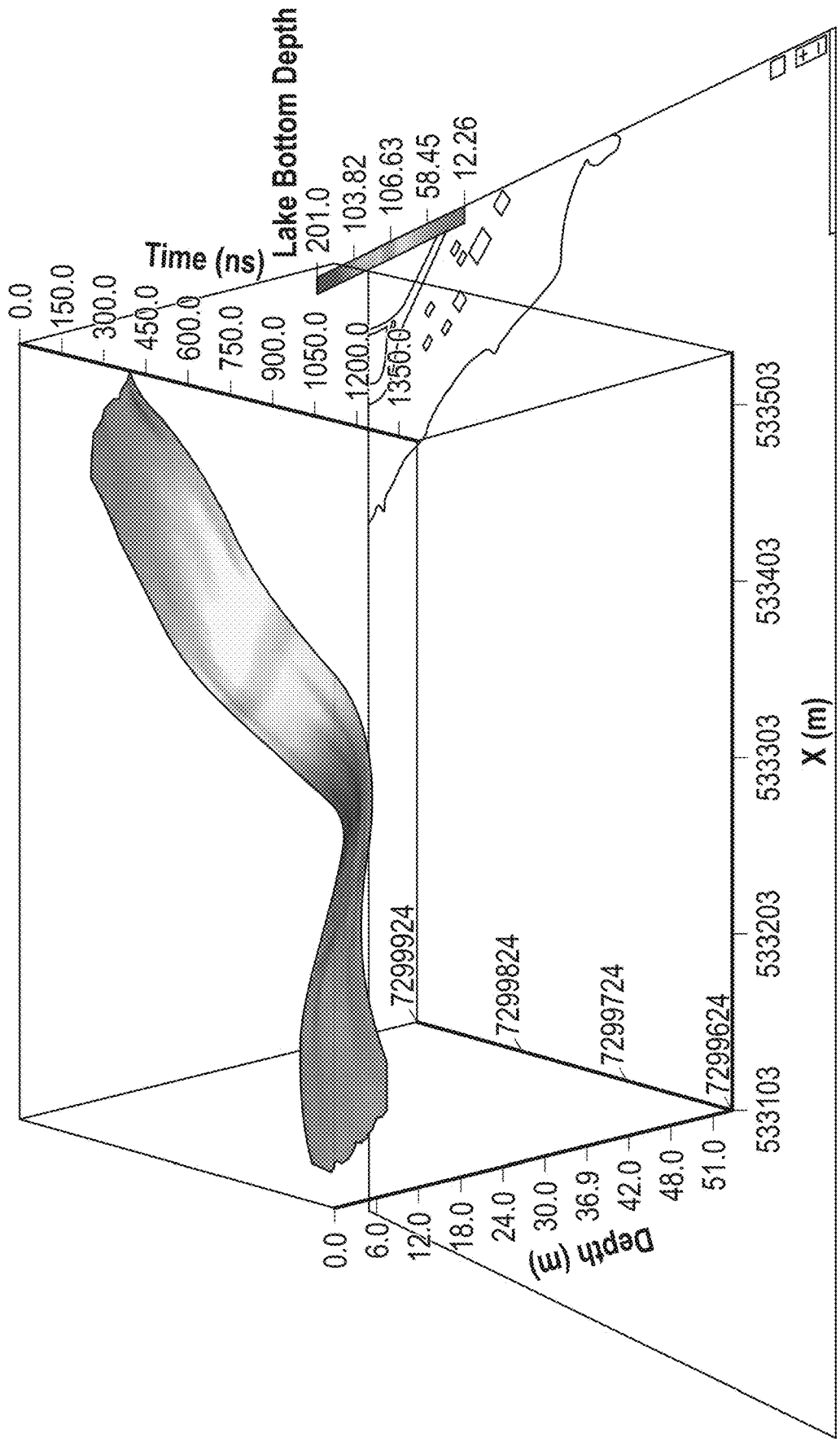
FIG. 7 is a graph illustrating bathymetry in accordance with the present disclosure.

Referring to FIG. 7, an image illustrating bathymetry is shown in accordance with the present disclosure. Bathymetry (e.g., submarine topography) is the measurement of depth of water, for example in oceans, seas, and/or lakes. The image shows an example lake bottom depth as measured using the disclosed systems and methods, overlaid on an image of the lake and its shoreline.

Figure 8:
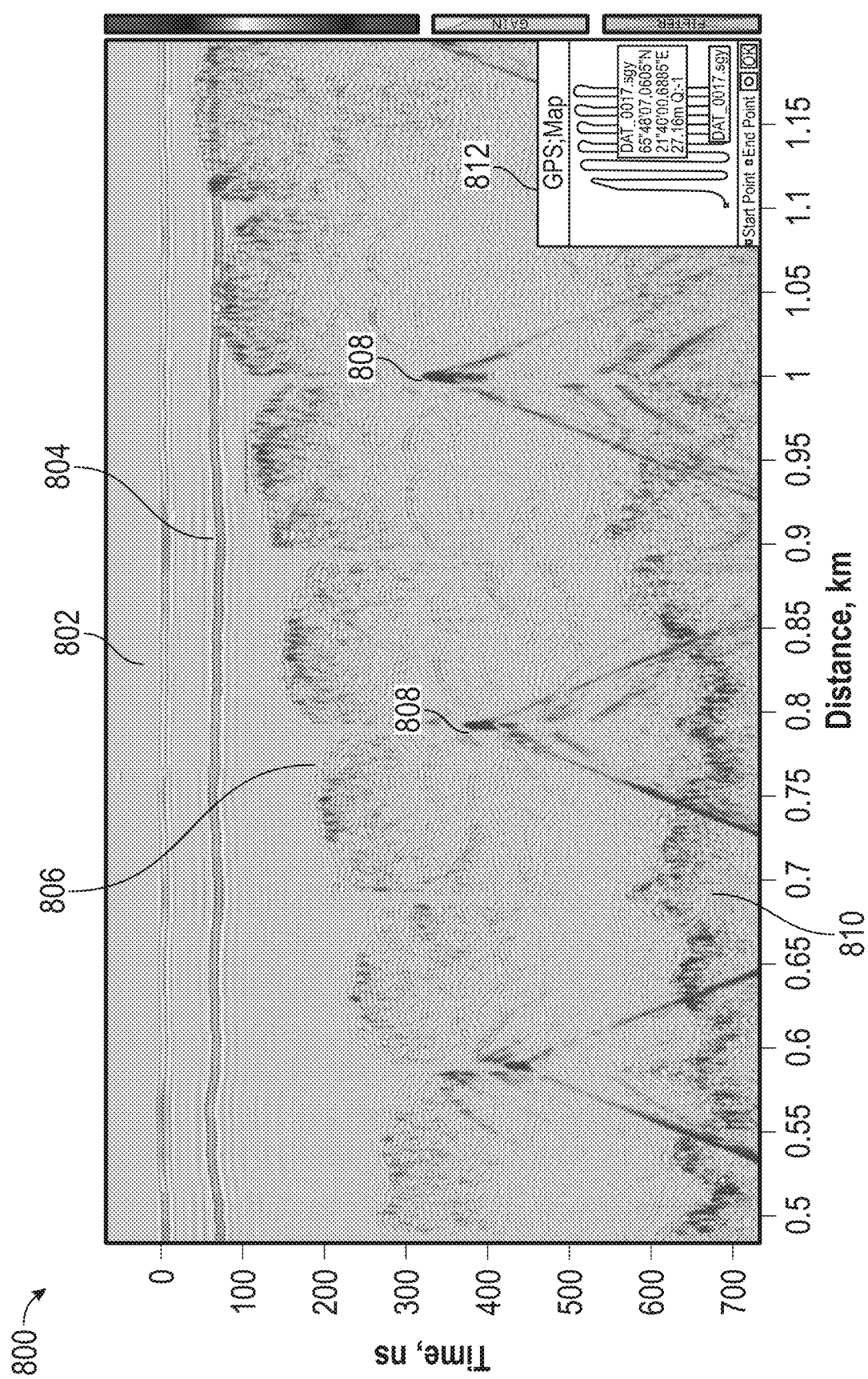
FIG. 8 is an image depicting a river-bed survey in accordance with the present disclosure.

With reference to FIG. 8 an image depicting a river-bed survey 800 is shown in accordance with the present disclosure. The river-bed survey 800 includes water surface 802 and a thermocline layer 804. A thermocline layer is the transition layer between warmer mixed water at the body of water's surface (e.g., the river's surface) and cooler deep water below. The river-bed survey 800 also includes the river bottom 806, bedrock 810, suspension bridge towers 808. A GPS map 812 of the survey path is shown in the bottom right hand side.

Figure 9:
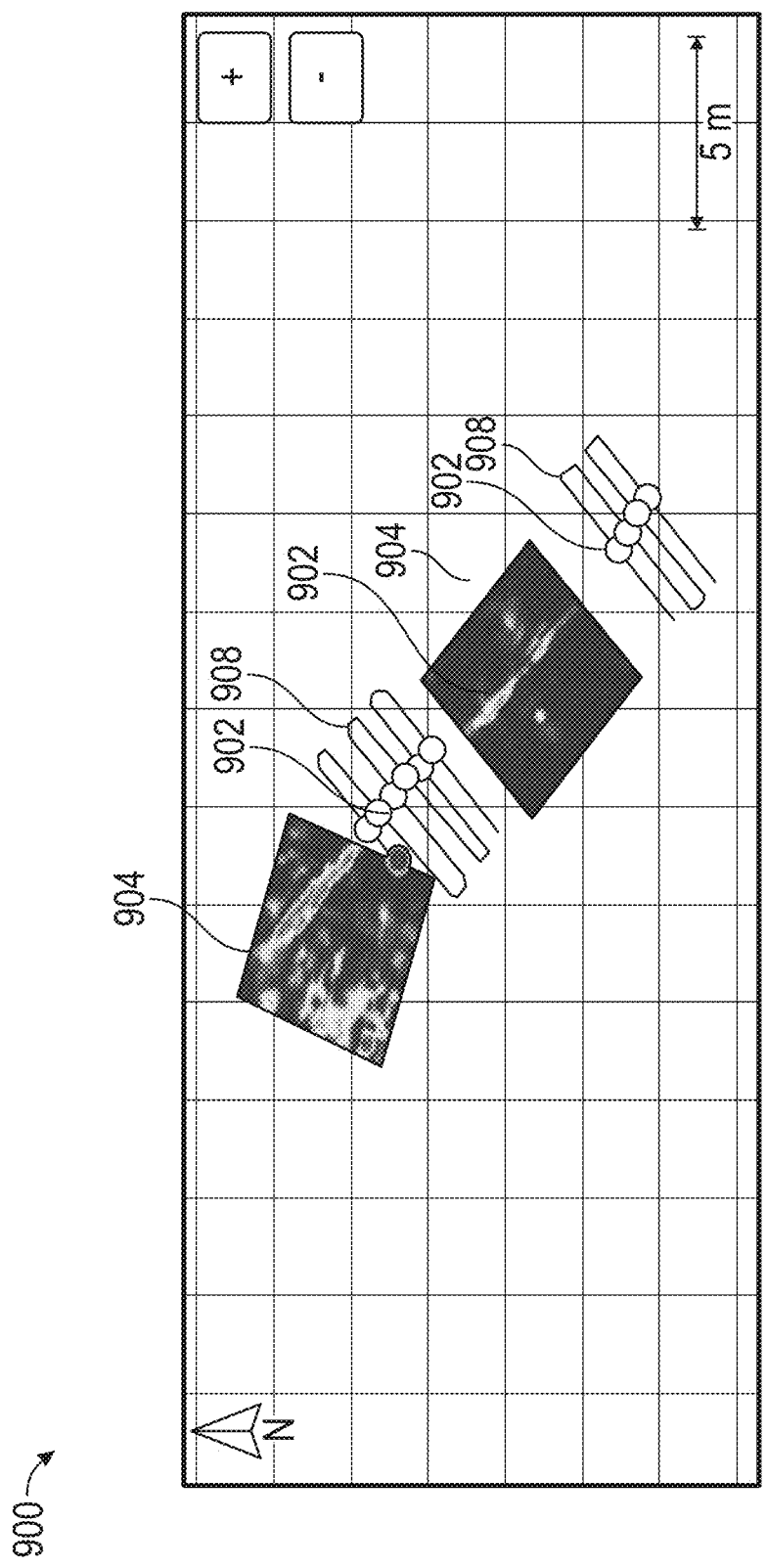
FIG. 9 is an illustration of a 3D display of a site map, in accordance with the present disclosure.

Referring to FIG. 9, an illustration of a 3D display 900 of a site map is shown, in accordance with the present disclosure. For example, any identified subterranean objects (e.g., pipes 902) may be displayed in the 3D display 900 of a user's site map (e.g., a bird's eye view). The view may include a survey path 908, depth slices, field interpretations 904, flags, and/or collected lines.

Certain aspects of the present disclosure may include some, all, or none of the above advantages and/or one or more other advantages readily apparent to those skilled in the art from the drawings, descriptions, and claims included herein. Moreover, while specific advantages have been enumerated above, the various embodiments of the present disclosure may include all, some, or none of the enumerated advantages and/or other advantages not specifically enumerated above.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an embodiment," "in embodiments," "in various embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

It should be understood that the foregoing description is only illustrative of the present disclosure. Various alternatives and modifications can be devised by those skilled in the art without departing from the disclosure. Accordingly, the present disclosure is intended to embrace all such alternatives, modifications, and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. An unmanned aerial vehicle ("UAV") system for mapping an object buried in a subterranean surface, the UAV system comprises:
   a UAV;
   a sensor array;
   a processor; and
   a memory, including instructions, which when executed by the processor, cause the system to:
      receive a first input data set, the first input data set based on a Global Navigation Satellite System ("GNSS") signal, a Synthetic Aperture and RADAR ("SAW") signal, and a Ground Penetrating Radar ("GPR") signal;
      generate a raw image based on the first input data set; and
      compare the raw image to a calibration data set, the calibration data set based on material calibration data,
      wherein the material calibration data is based on unique spectral reflection patterns of an object in a controlled environment at predefined heights and subterranean conditions.

2. The system of claim 1, wherein the sensor array comprises:
   a GNSS sensor disposed on the UAV configured to receive the GNSS signal;
   a SAR sensor disposed on the UAV configured to receive the SAR signal; and
   a GPR sensor disposed on the UAV configured to receive the GPR signal.

3. The system of claim 1, wherein the instructions, when executed, further cause the system to identify an object based on the raw image compared to the calibration data set.

4. The system of claim 3, wherein the instructions, when executed, further cause the system to transmit object data to a ground-based post-processing unit for further identifying the object data, the object data based on the object identified.

5. The system of claim 4, wherein the instructions, when executed, further cause the system to display the object data to a graphic user interface.

6. The system of claim 3, wherein the instructions, when executed, further cause the system to generate an augmented image based on the first input data set, the calibration data set, and the identified object.

7. The system of claim 6, wherein the instructions, when executed, further cause the system to display the augmented image to a graphic user interface.

8. The system of claim 3, wherein the instructions, when executed, further cause the system to generate an augmented image based on the post-processed object data.

9. The system of claim 1, wherein the instructions, when executed, further cause the system to determine by a machine learning algorithm the identification of unknown objects buried underground in various subterranean environments by analyzing the first input data set.

10. The system of claim 9, wherein the machine learning algorithm includes a neural network.

11. The system of claim 4, wherein the instructions, when displaying the object data to a graphic user interface, further cause the system to:
   generate a 3D image based on comparing the raw image to the calibration data set.

12. The system of claim 11, wherein the 3D image includes at least one of a survey path, a depth slice, or a field overlay.

13. A method for mapping an object buried in a subterranean surface, the method comprising:
   receiving a first input data set, the first input data set based on a Global Navigation Satellite System ("GNSS") signal, a Synthetic Aperture and RADAR ("SAR") signal, and a Ground Penetrating Radar ("GPR") signal;
   generating a raw image based on the first input data set; and
   comparing the raw image to a calibration data set, the calibration data set based on material calibration data,
   wherein the material calibration data is based on unique spectral reflection patterns of an object in a controlled environment at predefined heights and subterranean conditions.

14. The method of claim 13, further comprising:
   comparing the raw image to a calibration data set, the calibration data set based on material calibration data; and
   identifying an object based on the raw image compared to the calibration data set.

15. The method of claim 14, further comprising transmitting object data to a ground-based post-processing unit, the object data based on the object identified.

16. The method of claim 15, further comprising displaying the object data to a graphic user interface.

17. The method of claim 13, further comprising determining, by a machine learning algorithm, the identification of unknown objects buried underground in various subterranean environments by analyzing the first input data set.

18. A non-transitory storage medium that stores a program causing a processor to execute a method for mapping an object buried in a subterranean surface, the method comprising:
   receiving a first input data set, the first input data set based on a Global Navigation Satellite System ("GNSS") signal, a Synthetic Aperture and RADAR ("SAR") signal, and a Ground Penetrating Radar ("GPR") signal;
   generating a raw image based on the first input data set;
   comparing the raw image to a calibration data set, the calibration data set based on material calibration data;
   identifying an object based on the raw image compared to the calibration data set; and
   comparing the raw image to a calibration data set, the calibration data set based on material calibration data,
   wherein the material calibration data is based on unique spectral reflection patterns of an object in a controlled environment at predefined heights and subterranean conditions.

* * * * *